(12) United States Patent
Cantrill

(10) Patent No.: US 7,437,716 B1
(45) Date of Patent: Oct. 14, 2008

(54) SEPARATION OF DATA FROM METADATA IN A TRACING FRAMEWORK

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 704 days.

(21) Appl. No.: 10/713,612

(22) Filed: Nov. 14, 2003

(51) Int. Cl.
*G06F 9/44* (2006.01)

(52) U.S. Cl. .................. 717/128; 717/151; 438/758

(58) Field of Classification Search .................. 717/128
See application file for complete search history.

(56) References Cited

U.S. PATENT DOCUMENTS

| | | | | |
|---|---|---|---|---|
| 5,142,679 A | * | 8/1992 | Owaki et al. | 717/151 |
| 5,768,592 A | * | 6/1998 | Chang | 438/758 |
| 6,362,779 B1 | * | 3/2002 | Meek et al. | 342/357.13 |
| 6,457,143 B1 | * | 9/2002 | Yue | 714/43 |
| 6,769,117 B2 | * | 7/2004 | Moore | 717/130 |
| 2004/0267691 A1 | * | 12/2004 | Vasudeva | 707/1 |

OTHER PUBLICATIONS

Tamches, Ariel and Miller, Barton P. Fine-Grained Dynamic Instrumentation of Commodity Operating System Kernels. [Online] http://www.usenix.org/publications/library/proceedings/osdi99/full_papers/tamches/tamches.pdf, Published Feb. 1999.

Murayama, John. Performance Profiling Using TNF; [Online] http://developers.sun.com/solaris/articles/tnf.html, Jul. 2001.

Lorch, Jacob R. and Smith, Alan J. The VTrace Tool: Building a System Tracer for Windows NT and Windows 2000. [Online] http://msdn.microsoft.com/msdnmag/issues/1000/VTrace/default.aspx, Oct. 2000.

Chapter 10. The Generalized Trace Facility (GTF). [Online] http://publib.boulder.ibm.com/cgi-bin/bookmgr/BOOKS/IEA2V100/CCONTENTS, Jan. 2001.

Mirgorodskii, Alex. The Path to Portable Kernel Instrumentation: The Kerninst API. http://www.dyninst.org/mtg2003/slides/KerninstAPI.pdf, Apr. 2003.

Richard Moore, et al. IBM Dynamic Probes http://www-124.ibm.com/developerworks/opensource/linux/projects/dprobes/README, 2000.

K. Yaghmour et al.; "Measuring and Characterizing System Behavior Using Kernel-Level Event Logging"; Proceeding of the 2000 USENIX Annual Technical Conference; Jun. 18-23, 2000, San Diego, California, USA.

* cited by examiner

*Primary Examiner*—Wei Y. Zhen
*Assistant Examiner*—Phillip H Nguyen
(74) *Attorney, Agent, or Firm*—Osha Liang LLP

(57) ABSTRACT

A method for storing a data set having an enabled probe identification component and an associated data component, including obtaining data from an instrumented program using a probe, associating the data with an enabled probe identification, and storing the data in the data set, wherein the enabled probe identification is stored in the enabled probe identification component and the data is stored in the associated data set component.

10 Claims, 5 Drawing Sheets

SEPARATION OF DATA FROM METADATA IN A TRACING FRAMEWORK

BACKGROUND

Analyzing the dynamic behavior and performance of a complex software system is difficult. Typically, analysis of a software system is achieved by gathering data at each system call and post-processing the data. The following is a brief description of conventional tracing frameworks used to analyze software.

The conventional tracing frameworks were typically composed of various independent software modules. The primary source of information accessed by the conventional tracing frameworks is the kernel. The conventional tracing frameworks typically include a trace facility, a trace module, a daemon, and an offline data analysis and processing component. The trace facility gathers information from various components of the kernel and forwards events to the trace module. The trace module subsequently logs the events in its buffer. Periodically, the trace daemon reads the events from the trace module buffer and commits the recorded events into a user-provided file.

The trace facility is typically an extension of the core kernel facilities. The trace facility provides a unique entry point to all of the other kernel facilities requesting or requiring that an event be traced. Such events are not logged, but instead, the trace request is forwarded to the trace module. If the trace module is compiled as part of the kernel, then the trace module achieves this functionality by registering itself with the trace facility upon system startup. Otherwise, if the trace module is compiled and loaded as a separate module, then the registration takes place when the trace module is loaded.

During the registration process, the trace module provides the trace facility with a call-back function that is called whenever an event occurs. If no trace module is registered, then the traced events are ignored. Furthermore, the registration process provides the trace module with the ability to configure the manner in which the instruction pointer values are recorded upon the occurrence of a system call. Once configured, the kernel browses the stack to find an instruction pointer matching the desired constraints whenever a system call occurs. In summary, the kernel trace facility acts as a link between the trace module and the different kernel facilities.

The trace module stores the incoming event descriptions and delivers them efficiently to the daemon. More specifically, the trace module retrieves additional information for each event occurring in the kernel. This additional information includes the time at which the event occurred, the CPU identifier for the event, and additional data of interest. The trace module typically stores the data together with corresponding metadata. The metadata describes the layout of the data retrieved from the kernel. The metadata is typically used during post processing. Each piece of data stored in the trace module is associated with metadata. The metadata associated with the data is typically stored immediately before the data.

Returning to the discussion of the conventional tracing framework, to efficiently deal with the large quantity of data stored by the trace module, the trace module typically uses a double-buffering scheme where a write buffer is used to log events until a threshold limit is reached. When the threshold limit is reached, the daemon is notified. Once the write buffer has been filled (or the threshold is reached), the trace module assigns the current buffer as the read buffer and uses the previous read buffer as the new write buffer. The daemon subsequently retrieves the data from the current read buffer.

The primary function of the daemon is to retrieve and store the information accumulated by the trace module, typically in a file. The daemon provides the user with a number of options to control the tracing process. In addition to giving the user access to the options available from the trace module, the daemon allows the user specify the tracing duration. Once the daemon is launched, the daemon opens and configures the trace module, and sets a timer if a time duration was specified. Otherwise, the user terminates the daemon process manually to stop the trace.

During normal operation, the daemon typically sleeps, awaiting a signal to read from the trace module, or timer/terminate events to end tracing. Similar to the trace module, the daemon uses double buffering. When the daemon receives a signal from the trace module, the daemon reads the content of the buffer denoted as the read buffer and appends the content to the content in an associated internal buffer (not shown). Once the internal buffer is full, the contents of the internal buffer is committed to a file and, during this process, a second internal buffer is used to record the incoming data.

To enable processing of the event data, conventional tracing frameworks typically require the state information for the software system state prior to performing the trace. Specifically, the daemon reviews one or more system directories and records the following characteristics for each process: 1) process ID (PID); 2) name; and 3) parent's PID (PPID). The state information is typically retrieved after the configuration of the trace module and prior to the start of the trace. The information retrieved is stored in a file that is later used by the analysis software. Unlike the previously mentioned components of the conventional tracing framework, the data analysis and presentation software is typically run off-line. The software uses both the initial process state and the trace data files created by the daemon to recreate the dynamic behavior of the system in a particular observed time interval. Collating and sorting utilities with the software are used to display the stored information at the user-level.

SUMMARY

In general, in one aspect, the invention relates to a method for storing a data set having an enabled probe identification component and an associated data component, comprising obtaining data from an instrumented program using a probe, associating the data with an enabled probe identification, and storing the data in the data set, wherein the enabled probe identification is stored in the enabled probe identification component and the data is stored in the associated data set component.

In general, in one aspect, the invention relates to a method for processing a data set, comprising copying the data set to a user-level buffer, wherein the data set comprises an enabled probe identification and data, obtaining the enabled probe identification from the data set, obtaining metadata using the enabled probe identification, and processing the data set using the data and the metadata.

In general, in one aspect, the invention relates a system for storing a data set, wherein the data set comprises an enabled probe identification component and a data component, comprising a probe obtaining data from an instrumented program, a tracing framework associating the probe with an enabled probe identification, and a buffer storing the data set, wherein the data is stored in the data component and the enabled probe identification is stored in the enabled probe identification component.

In general, in one aspect, the invention relates a system for storing a data set, wherein the data set comprises an enabled probe identification component and a data component, comprising a probe obtaining data from an instrumented program, a tracing framework assigning an enabled probe identification to an action and associating the probe with the enabled probe identification, and a per-consumer buffer storing the data set, wherein the data is stored in the data component and the enabled probe identification in the enabled probe identification component, and wherein the enabled probe identification is assigned to the action defined by the consumer associated with the per-consumer buffer.

Other aspects of the invention will be apparent from the following description and the appended claims.

DETAILED DESCRIPTION

Figure 1:
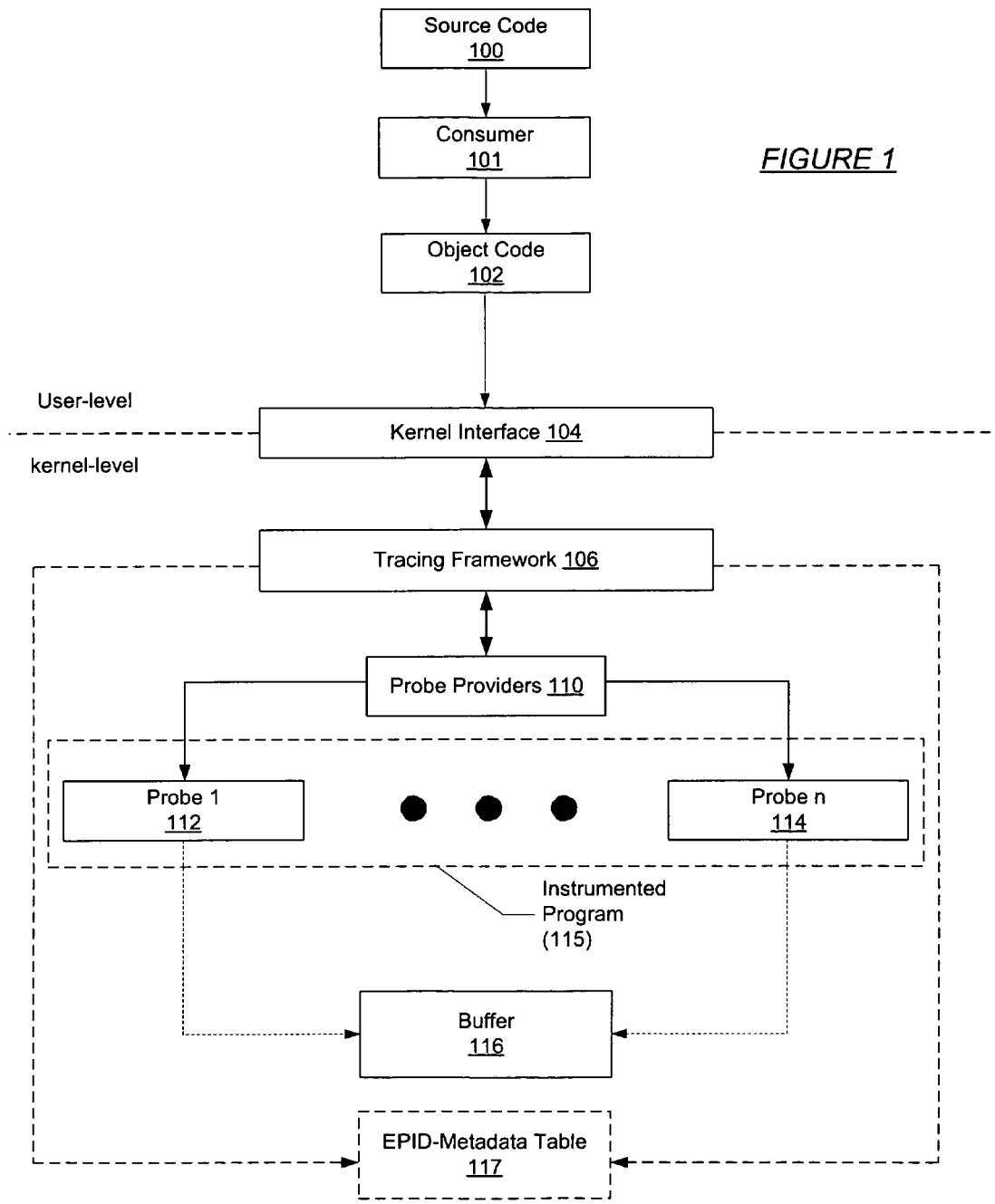
FIG. 1 shows a flow diagram detailing the collection of data in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 shows a flow diagram detailing the collection of data in accordance with one embodiment of the invention. Specifically, FIG. 1 provides an overview of the process for collecting data for the buffer (116). Initially, source code (100) is written/obtained/generated that defines a tracing function (i.e., a request to obtain certain data). More specifically, the tracing function defines which probes (112, 114) to enable within the instrumented program (115), and what actions that the tracing framework (106) is to perform when the probes (112, 114) are triggered (i.e., when a program thread executing the instrumented program (115) encounters a probe (112, 114)). In one or more embodiments of the invention, a tracing function may define one or more actions that the tracing framework (106) is to perform when a probe (112, 114) is encountered. Each action defined by the tracing function is identified by an enable probe identifier (EPID).

The source code (100) is typically associated with a consumer (101). Note that a consumer (101) may define one or more tracing functions. The consumer is a virtual client that sends requests, in the form of tracing functions, to the tracing framework (106) to obtain information about the instrumented program (115). Further, the consumer (101) also retrieves the requested information, which is stored by the tracing framework (106) in the associated buffers (116). EPIDs may be defined on a per-consumer basis or on a per-system basis.

If the EIPDs are defined on a per-consumer basis, the EPIDs only uniquely identify an action with respect to other actions defined by the consumer (101). Accordingly, in this embodiment the data obtained from the probes (112, 114) is typically stored in a per-consumer buffer. If the tracing framework (106) is implemented on a multiprocessor system, then the data obtained from the probes (112, 114) is typically stored in a per-consumer per CPU buffer. Alternatively, if the EPIDs are defined on a per-system basis, the tracing framework (106) typically includes functionality to uniquely define each action for each consumer such that each action, regardless of the consumer (101) with which it is associated with, may be uniquely identified within the system.

In one embodiment of the invention, the EPID is an integer. Alternatively, the EPID may be represented using any alphanumeric string that is sufficient to identify the corresponding action on a per-consumer or a per-system basis.

Returning to FIG. 1, the source code (100) is subsequently forwarded, via the consumer (101) to a compiler (not shown), where the source code (100) is compiled to generate executable object code (102). The object code (102) is then communicated to a tracing framework (106) via a kernel interface (104). The tracing framework (106) includes functionality to execute the object code (102). Specifically, the tracing framework (106) interprets the object code (102) and directs the probe providers (110) to activate certain probes (112, 114) within the instrumented program (115). In addition, the tracing framework (106) may include functionality to associate each EPID, defined in tracing function, with a probe (112, 114).

Figure 5:
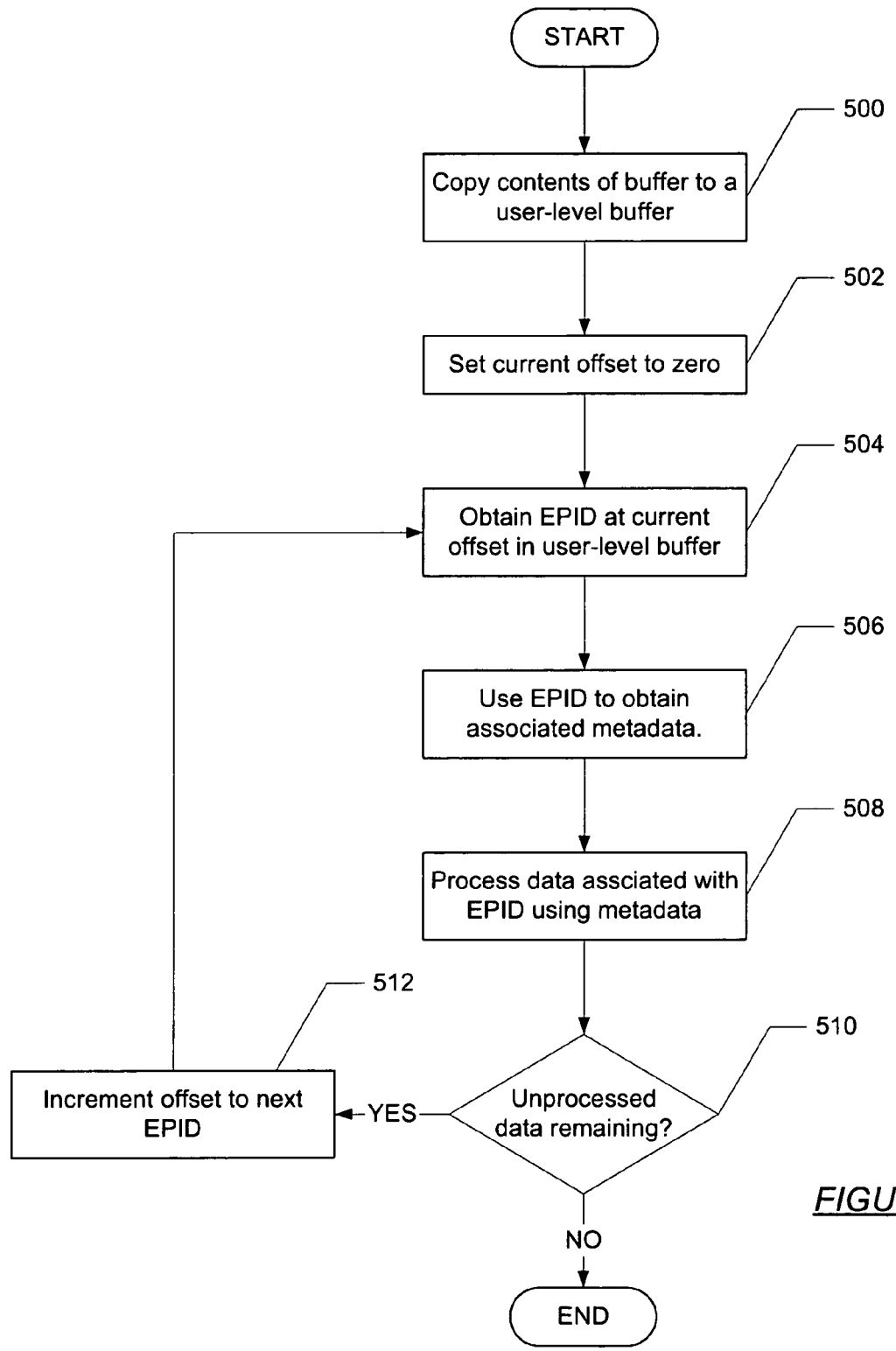
FIG. 5 shows a flowchart for retrieving data from a buffer in accordance with one embodiment of the invention.

In addition, the tracing framework (106) may include functionality to generate and populate an EPID-Metadata table (117) or a corresponding data structure that includes metadata defining the data layout of the data associated with a given EPID. The metadata information may be extracted from the source code (100), the object code (102), or obtained from a combination of data structures within the tracing framework (106). Further, the EPID-Metadata table (117) may be defined statically or, alternatively, the EPID-Metadata may be determined dynamically as required/requested by the tracing framework (106) or the consumer (101). Refer to FIG. 5 below for additional details regarding the EPID-Metadata table (117).

Returning to FIG. 1, the probes (112, 114) gather the specified information from the instrumented program (115), as defined by the object code (102) derived from the actions defined within the source code (100), and forward the information (directly or indirectly) to a corresponding buffer (116). The buffer (116), or a related process analyzes the information and stores the information as a data set. An embodiment of the data set is described below with respect to FIG. 2.

Figure 2:
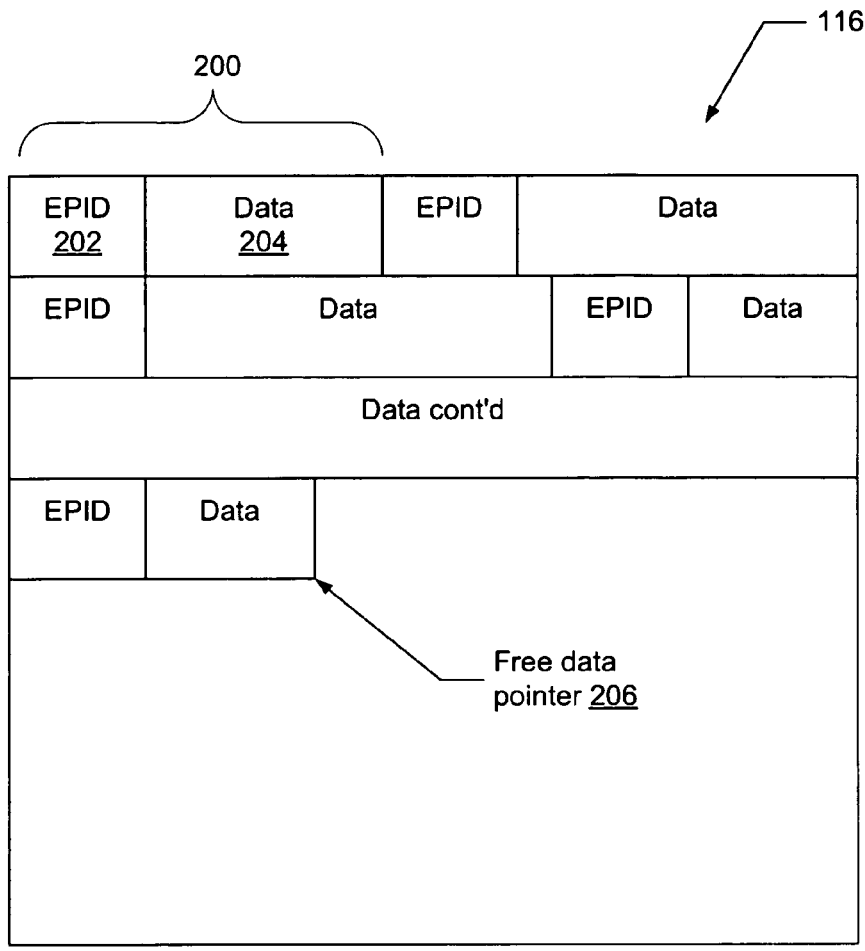
FIG. 2 shows a buffer layout in accordance with one embodiment of the invention.

FIG. 2 shows a buffer layout in accordance with one embodiment of the invention. As mentioned above, the data obtained from the probes (112, 114) is associated with an EPID and subsequently stored in the buffer (116). In one embodiment of the invention, the data and associated EPID are stored as a data set (200). The data set (200) includes an EPID (202) component followed by a data (204) component. In one or more embodiments of the invention, the data set (200) is added to the buffer (116) at the free data pointer (206). Those skilled in the art will appreciate that the data (204) may be of any individual data type or an aggregate data type. Further, the data (204) may be individual pieces of data, or two or more pieces of data concatenated together. The exact composition of the data (204), as well as the layout of the data, is defined by the metadata associated with the EPID (202).

Those skilled in the art will appreciate that the while the invention has been described with respect to storing a data set (200) including an EPID (202) component and a data (204) component, a tracing function may be defined to only record the EPID, in which the EPID (202) is stored without the data (204).

Figure 3:
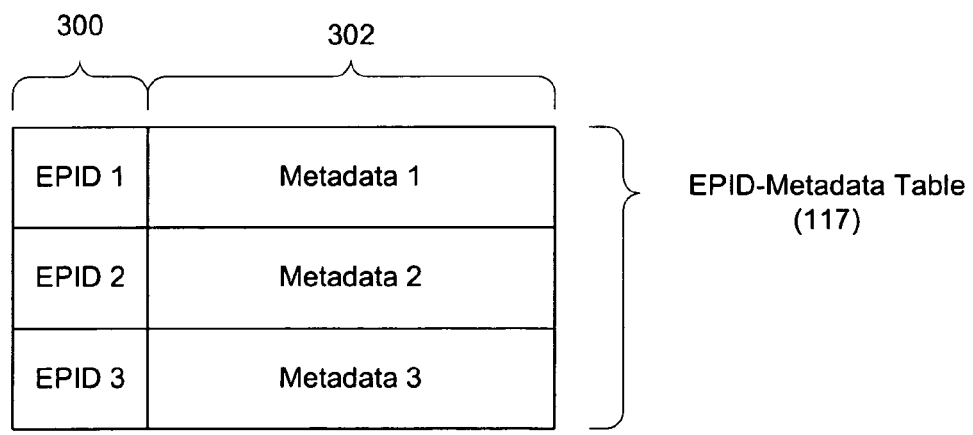
FIG. 3 shows an Enabled Probe Identification ("EPID")-Metadata Table layout in accordance with one embodiment of the invention.

FIG. 3 shows an EPID-Metadata table layout in accordance with one embodiment of the invention. The EPID-Metadata table (117) includes a list of EPIDs (300) and associated metadata (302) defining the data layout of the data (204) associated with the EPID (202) in the buffer (116). The metadata (302) may include, but is not limited to, the action function, the action name, the module, the data size, the data layout, the data type, etc.

Figure 4:
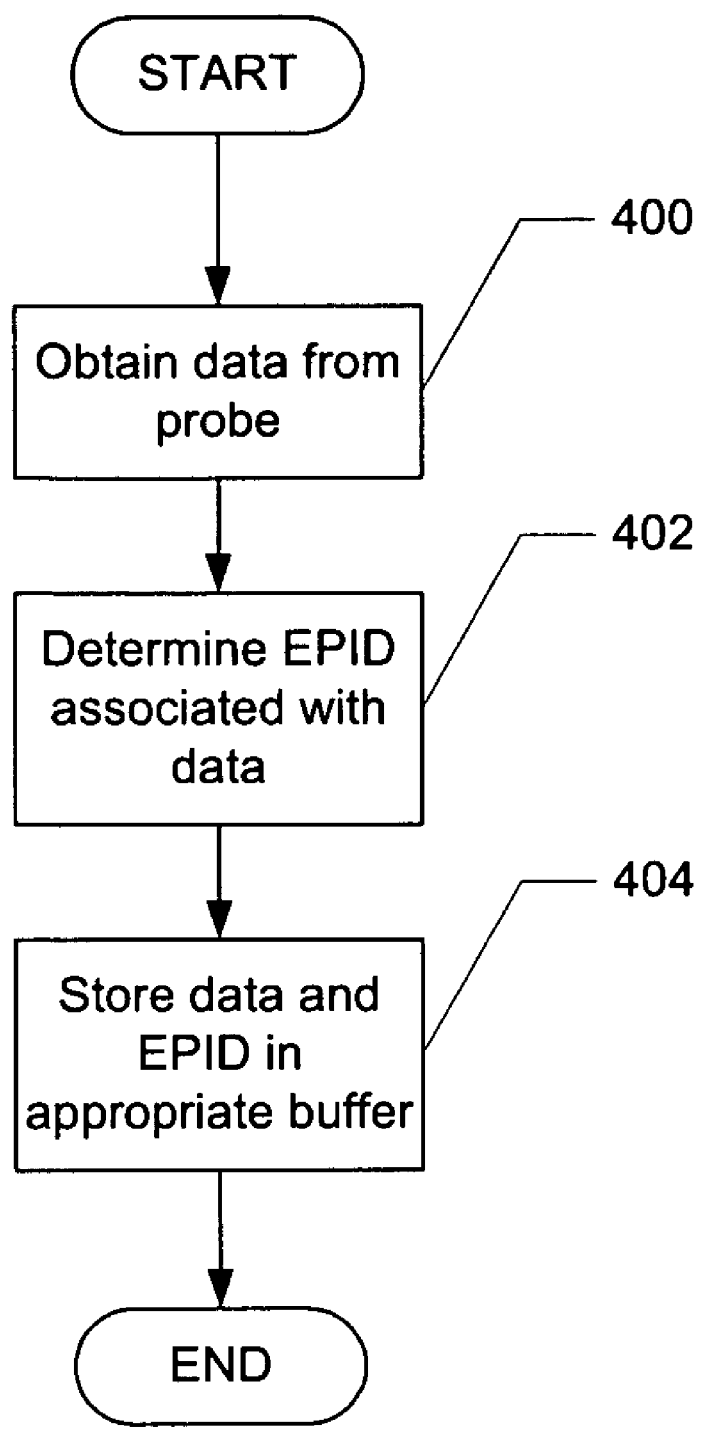
FIG. 4 shows a flowchart for storing data in a buffer in accordance with one embodiment of the invention.

FIG. 4 shows a flowchart for storing data in a buffer in accordance with one embodiment of the invention. Initially, data (204) is obtained from a probe (112, 114) (Step 400). The data (204) is subsequently associated with an EPID (202) (Step 402). The tracing framework (106) includes the necessary data structures to map a given action on a probe (112, 114) to an EPID (202). In one embodiment of the invention, the tracing framework (106) includes an EPID-action table (not shown). If EPIDs are defined on a per-consumer basis, then the tracing framework may include an EPID-action table for each consumer (101). Alternatively, if the EPIDs are defined on a per-system basis, then a global EPID-action table may be used. Those skilled in the art will appreciate that the EPID-action tables may be implemented using arrays, hash tables, linked lists, etc.

Further, those skilled in the art will appreciate that because each action traces a constant amount of data and because a particular action does not change during the time it is tracing an instrumented program, when a probe is triggered and a subsequent action is carried out, the space required to store the data in the buffer may be determined a priori. This property of the invention applies to cases where action includes more than one data-storing step, in which case the offsets for each data-storing step are determined a priori. Accordingly, there is no need for metadata computation or storage when a probe is triggered.

Returning to FIG. 4, once an EPID (202) has been associated with the data (204), the data is stored as a data set (200) in a buffer (116) (Step 404). If the EPIDs are defined on a per-consumer basis, then the data sets (200) are stored on in a per-consumer buffer. Alternatively, if the EPIDs are defined on a per-system basis then the data sets (200) are stored in a non-consumer specific buffer.

FIG. 5 shows a flowchart for retrieving data from a buffer in accordance with one embodiment of the invention. Initially, the contents of the buffer (116) is copied to a user-level buffer (not shown) (Step 500). The contents of the buffer (116) may be copied at set intervals, when requested by a consumer (101), etc. The current offset in the user-level buffer is then set to zero (Step 502). The EPID (202) at the current offset in the user-level buffer is subsequently obtained (Step 504). The EPID (202) at the current offset is used as reference into a data structure, typically a kernel level data structure, to obtain the associated metadata (302) (Step 506). The request to obtain the associated metadata from the data structure, using the EPID as a reference, is typically handled by the tracing framework (106).

In one embodiment of the invention, the data structure is the EPID-Metadata table (117). Alternatively, the metadata associated with the EPID may be obtained dynamically. Regardless of which of the aforementioned embodiments is implemented by the tracing framework (106), in one or more embodiments of the invention the metadata associated with the EPID is requested by and returned to the consumer (101) using a low-bandwidth side-channel. Note that if there are multiple data-storing sub-actions within a given action (defined above), the metadata returned to the consumer (101) may include the necessary offset and type information to extract the individual sub-components stored within the data (204).

In one embodiment of the invention, the consumer (101) requesting the metadata (302) associated with the EPID (202) may cache the results of the request for metadata (302) into a user-level data structure. Thus, if the consumer (100) is implemented using the aforementioned embodiment, then the consumer (101) initially searches the cache for the associated metadata prior to sending a request to the tracing framework (106), and only sends a request to the tracing framework (106) if the associated metadata is not found in the cache.

Returning to FIG. 5, once the metadata (302) associated with the EPID (202) has been obtained, the metadata (302) is used to process the data (204) associated with the EPID (202) (Step 508). Once the data (204) has been processed using the metadata (302), the consumer (101) determines if there is any unprocessed data remaining in the buffer (116) (Step 510). If there is no unprocessed data remaining in the buffer (116), then the processing is complete. However, if there is unprocessed data remaining in the buffer (116), then the consumer (101) increments the offset to the next EPID, using the data size component of the metadata (302) (Step 512). Steps 504-510 are subsequently repeated until there is no unprocessed data remaining in the buffer (116).

Those skilled in the art will appreciate that while the aforementioned embodiment describes an EPID-Metadata data structure residing in the kernel, the EPID-Metadata structure may also reside outside the kernel. Specifically, the EPID-Metadata data structure (e.g., the EPID-Metadata table (117)) may reside at the user-level and be updated when new EPIDs are assigned.

Figure 6:
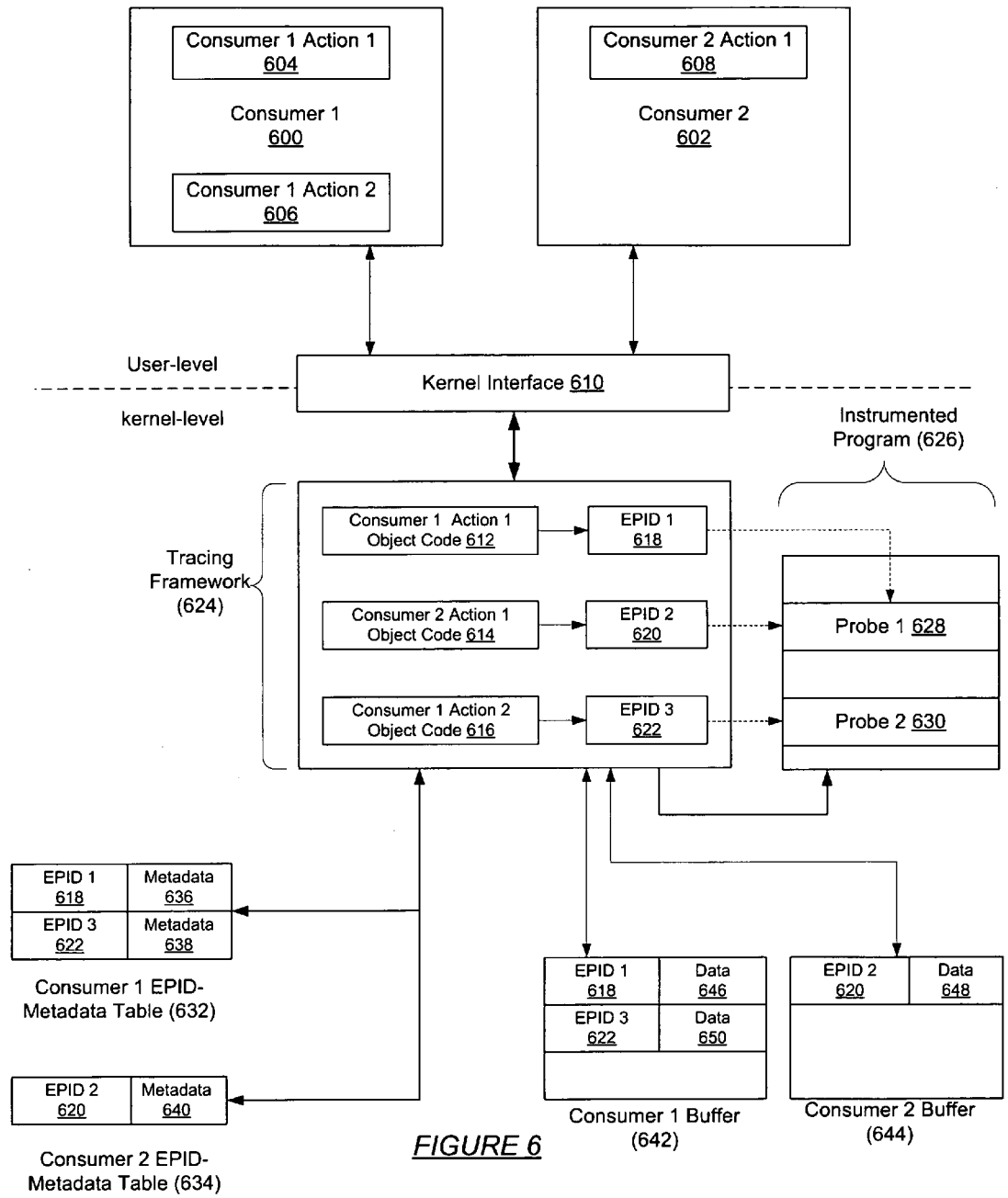
FIG. 6 shows a schematic diagram in accordance with one embodiment of the invention.

FIG. 6 shows a schematic diagram in accordance with one embodiment of the invention. Specifically, FIG. 6 shows an example on an implementation of the invention in accordance with one embodiment of the invention. In this example, Consumer 1 (600) defines two actions: Consumer 1 Action 1 (604) and Consumer 1 Action 2 (606), and Consumer 2 (602) defines one action: Consumer 2 Action 1 (608). Each of the aforementioned consumer actions (604, 606, 608) corresponds to an action as defined by a tracing function within a consumer (600, 602). The consumer actions (604, 606, 608) are subsequently compiled to obtain Consumer 1 Action 1 Object Code (612), Consumer 1 Action 2 Object Code (614), and Consumer 2 Action 1 Object Code (618), respectively. The object code (612, 616, 618) is subsequently forwarded to a tracing framework (624), via a kernel interface (610).

The tracing framework (624) subsequently assigns an EPID to each piece of object code (612, 614, 616). In this example, EPID 1 (618), EPID 2 (620), and EPID 3 (622) are assigned to Consumer 1 Action 1 Object Code (612), Consumer 1 Action 2 Object Code (614), and Consumer 2 Action 1 Object Code (618), respectively. In this particular example, the EPIDs are assigned on a per-consumer basis, thus the EPIDs (618, 620, 622) for a given consumer (600, 602) are unique with respect to all other EPIDs assigned to actions associated with the particular consumer (600, 602) but may not be unique with respect to all actions defined within the system.

Returning to FIG. 6, EPID 1 (618) and EPID 2 (622) are subsequently associated with probes in an instrumented program (626). EPID 1 (618) and EPID 2 (620) are associated with probe 1 (628) and EPID 3 (622) is associated with probe 2 (630). In addition, per-consumer EPID-Metadata tables are populated. Specifically, a Consumer 1 EPID-Metadata table (632) is populated to include metadata (636) associated with EPID 1 (618) and metadata (638) associated with EPID 3 (622). Further, a Consumer 2 EPID-Metadata table (634) is populated to include metadata (640) associated with EPID 2 (620). In addition, the tracing framework (624) allocates per-consumer buffers (i.e., Consumer 1 Buffer (642) and Consumer 2 Buffer (644)) to store the data sets (e.g., 200 in FIG. 2).

Once the EPIDs (618, 620, 622) have been assigned to the actions (604, 606, 608), the metadata (636, 638, 640) associated with the EPIDs (618, 620, 622) has been stored in the per-consumer EPID-Metadata Tables (632, 634), and the per-consumer buffers (642, 644) allocated, the tracing framework (624) begins tracing through the instrumented program (626).

Whenever a probe (628, 630) is encountered during the tracing of the instrumented program (626), the tracing framework (624) obtains data from the triggered probe in accordance with the associated actions. In this example, if probe 1 (628) is encountered, the tracing framework (624) obtains information from probe 1 (628) in accordance with Consumer 1 Action 1 (604) and Consumer 2 Action 1 (608). The data obtained for each action (604, 608) is associated with the corresponding EPID (618, 620 respectively), and stored in the appropriate per-Consumer Buffer (i.e., EPID 1 and associated data (646) are stored in Consumer 1 buffer (642) and EPID 2 (620) and associated data (648) are stored in Consumer 2 Buffer (644)). Similarly, if probe 2 (630) is encountered, the tracing framework (624) obtains data in accordance with Consumer 1 Action 2 (606). The data obtained in accordance with the action (606) is associated with the corresponding EPID (i.e., EPID 3 (622)). The data (650) and the associated EPID (i.e., EPID 3 (622)) are subsequently stored in the appropriate per-consumer buffer (i.e., consumer 1 buffer (642)).

Upon completion of the tracing, the consumers (600, 602) copy the contents of the respective per-consumer buffers into corresponding user-level buffer (not shown). The contents are subsequently processed in accordance with the method described in FIG. 4.

Those skilled in the art will appreciate that while embodiments of the invention have been described with respect to the tracing framework assigning an EPID to an action, any other process in the user-level or the kernel level may assign an EPID to an action, as long as the EPID-action mapping is conveyed to the tracing framework or is accessible to the tracing framework.

Embodiments of the invention may have one or more of the following advantages. The invention provides an efficient means for storing data obtaining from a tracing an instrumented program. More specifically, the invention provides a means to store data without the associated metadata. Further, the invention provides a means to use a low bandwidth side-channel to transfer metadata to a consumer while reserving the principal data channel for the data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data, comprising:

encountering a probe during execution of an instrumented program, wherein the probe is associated with a first enabled probe identification (EPID) and a second EPID and wherein the first EPID is associated with a first action and the second EPID is associated with a second action;

executing the first action upon encountering the probe to obtain first data and executing the second action to obtain second data;

storing the first data and the first EPID in a first per-consumer buffer;

storing a first metadata and the first EPID in a first per-consumer metadata table, wherein the first metadata defines a layout of the first data stored in the first per-consumer buffer, and wherein the first per-consumer buffer and the first per-consumer metadata table are accessible by a first consumer;

storing the second data and the second EPID in a second per-consumer buffer; and storing a second metadata and the second EPID in a second per-consumer metadata table, wherein the second metadata defines a layout of the second data stored in the second per-consumer buffer, and wherein the second per-consumer buffer and the second per-consumer metadata table are accessible by a second consumer.

2. The method of claim 1, further comprising:

defining a tracing function wherein the tracing function comprises the first action.

3. The method of claim 2, wherein the tracing function is defined by the first consumer.

4. The method of claim 3, wherein the first EPID and the second EPID are defined on a per-consumer basis.

5. The method of claim 4, wherein the first metadata includes at least one selected from the group consisting of an action name associated with the first action, a module name, a data size, a data type, and an action function for the first action.

6. A system for storing a first data set and a second data set, comprising:

a probe encountered during execution of an instrumented program;

a tracing framework associating the probe with a first enabled probe identification (EPID) and a second EPID, wherein the first EPID is associated with a first action and the second EPID is associated with a second action, wherein executing the first action obtains a first data from the probe, and wherein executing the second action obtains a second data from the probe;

a first per-consumer buffer storing the first data set comprising the first EPID and the first data a first EPID-Metadata table relating the first EPID to a first metadata defining a layout of the first data obtained from the probe;

a second per-consumer buffer storing the second data set comprising the second EPID and the second data; and a second EPID-Metadata table relating the second EPID to a second metadata defining a layout of the second data obtained from the probe wherein the first action is provided by a first consumer associated with the first per-consumer buffer, and wherein the second action is provided by a second consumer associated with the second per-consumer buffer.

7. The system of claim 6, wherein the first metadata includes at least one selected from the group consisting of an action name, a module name, a data size, a data type, and an action function.

8. The system of claim 6, wherein the first enabled probe identification is defined with respect to the consumer.

9. A system for storing a first data set and a second data set, comprising:
- a probe encountered during execution of an instrumented program;
- a tracing framework:
    - assigning a first enabled probe identification (EPID) to a first action;
    - assigning a second EPID to a second action; and
    - associating the probe with the first EPID and the second EPID, wherein executing the first action obtains a first data by the probe, and wherein executing the second action obtains a second data by the probe;
- a first per-consumer buffer storing the first data set comprising the first data and the first EPID;
- a second per-consumer buffer storing the second data set comprising the second data and the second EPID;
- a first EPID-Metadata table relating the first EPID to a first metadata defining a layout of the first data obtained by the probe; and
- a second EPID-Metadata table relating the second EPID to a second metadata defining a layout of the second data obtained by the probe,
- wherein the first action is defined by a first consumer associated with the first per-consumer buffer, and
- wherein the second action is defined by a second consumer associated with the second per-consumer buffer.

10. The system of claim 9, wherein the first metadata includes at least one selected from the group consisting of an action name, a module name, a data size, a data type, and an action function.

* * * * *